(12) United States Patent
Hernandez et al.

(10) Patent No.: US 8,050,389 B2
(45) Date of Patent: Nov. 1, 2011

(54) METHOD AND SYSTEM FOR AUTOMATICALLY SELECTING OUTGOING VOICEMAIL MESSAGES

(75) Inventors: Yasmary Hernandez, Miami, FL (US); Nathan Shlomo Marz, San Diego, CA (US); Michael A. Paolini, Austin, TX (US); Lee Parnell Thompson, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1295 days.

(21) Appl. No.: 11/675,474

(22) Filed: Feb. 15, 2007

(65) Prior Publication Data

US 2008/0198982 A1    Aug. 21, 2008

(51) Int. Cl.
*H04M 1/64* (2006.01)
(52) U.S. Cl. .................... 379/88.25; 379/76; 379/142.06
(58) Field of Classification Search .... 379/88.01–88.28, 379/67
See application file for complete search history.

(56) References Cited

U.S. PATENT DOCUMENTS

| | | | | |
|---|---|---|---|---|
| 6,266,399 | B1 * | 7/2001 | Weller et al. ................ | 379/88.19 |
| 6,628,758 | B1 * | 9/2003 | Fejes .......................... | 379/67.1 |
| 7,072,452 | B1 * | 7/2006 | Roberts et al. ............. | 379/88.23 |
| 7,809,398 | B2 * | 10/2010 | Pearson ...................... | 455/550.1 |
| 2002/0080928 | A1 | 6/2002 | Bates et al. | |
| 2002/0090069 | A1 | 7/2002 | Yaker | |
| 2003/0031303 | A1 | 2/2003 | Lee et al. | |
| 2003/0206622 | A1 | 11/2003 | Foster | |
| 2003/0210771 | A1 | 11/2003 | Broussard et al. | |
| 2004/0111269 | A1 | 6/2004 | Koch | |
| 2005/0101303 | A1 | 5/2005 | Pelaez et al. | |
| 2005/0153729 | A1 | 7/2005 | Logan et al. | |
| 2005/0195947 | A1 | 9/2005 | Chatfield | |
| 2005/0201362 | A1 | 9/2005 | Klein et al. | |
| 2005/0271188 | A1 * | 12/2005 | Kraft et al. ................. | 379/88.19 |
| 2006/0008060 | A1 | 1/2006 | Memos | |
| 2006/0018445 | A1 | 1/2006 | Mittal | |

* cited by examiner

*Primary Examiner* — Simon Sing
*Assistant Examiner* — Assad Mohammed
(74) *Attorney, Agent, or Firm* — Yee & Associates, P.C.; David A. Mims, Jr.

(57) ABSTRACT

A system for automatically selecting an outgoing message for an incoming call. In response to receiving an incoming call, a calling party is identified. The identified calling party is compared against call log data to determine that the identified calling party has previously heard a first outgoing message. In response to determining that the identified calling party has not previously heard the first outgoing message, the first outgoing message is played as a selected outgoing message for the incoming call. In response to determining that the identified calling party has previously heard the first outgoing message, a second outgoing message is played as the selected outgoing message for the incoming call. Then, the call log data is updated to identify the selected outgoing message played for the incoming call.

15 Claims, 2 Drawing Sheets

METHOD AND SYSTEM FOR AUTOMATICALLY SELECTING OUTGOING VOICEMAIL MESSAGES

BACKGROUND OF THE INVENTION

1. Field of the Invention

The present invention relates generally to an improved communication system. More specifically, the present invention is directed to a computer implemented method, system, and computer usable program code for automatically selecting outgoing voicemail messages for incoming telephone calls based on call log data.

2. Description of the Related Art

Innovations in communications technologies have made a wide range of enhanced communications services available to customers. For example, a customer may dial a telephone number at the press of a key by using speed-dialing, retrieve a telephone number for a missed call, view a telephone number of an incoming call on a display by using caller identification (caller ID), and send or retrieve a voice message by using voicemail. A communications provider often provides these services through a network such as an intelligent services network (ISN) that is privately owned but that works in conjunction with the public switched telephone network (PSTN). These services also may be offered by a dedicated device, such as a telephone with advanced electronics.

Caller ID services allow for the identification of the originating call. The information sent to the receiving subscriber line includes the date, time, and calling number. Also, the name associated with the calling number is sometimes included with the information.

Voicemail systems allow callers the option to leave voicemail messages for parties who are unavailable to answer an incoming call. When an incoming call to a customer's telephone cannot be completed, the incoming call may be switched to and processed by the voicemail system. Voicemail customers may create voice greetings that are played when the customer is not available to answer an incoming call. However, voicemail customers infrequently change outgoing voicemail messages. As a result, callers hear the same outgoing voicemail message over and over again, which wastes the caller's time and may cause the caller to incur additional connection time charges. Currently, voicemail systems are not able to automatically select or change the outgoing voice messages for incoming calls.

Therefore, it would be beneficial to have an improved computer implemented method, system, and computer usable program code for allowing a voicemail system within a communication network to change outgoing voicemail messages based upon call log data and caller ID.

SUMMARY OF THE INVENTION

Illustrative embodiments provide a computer implemented method, system, and computer usable program code for automatically selecting an outgoing message for an incoming call. In response to receiving an incoming call, a calling party is identified. The identified calling party is compared against call log data to determine that the identified calling party has previously heard a first outgoing message. In response to determining that the identified calling party has not previously heard the first outgoing message, the first outgoing message is played as a selected outgoing message for the incoming call. In response to determining that the identified calling party has previously heard the first outgoing message, a second outgoing message is played as the selected outgoing message for the incoming call. Then, the call log data is updated to identify the selected outgoing message played for the incoming call.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
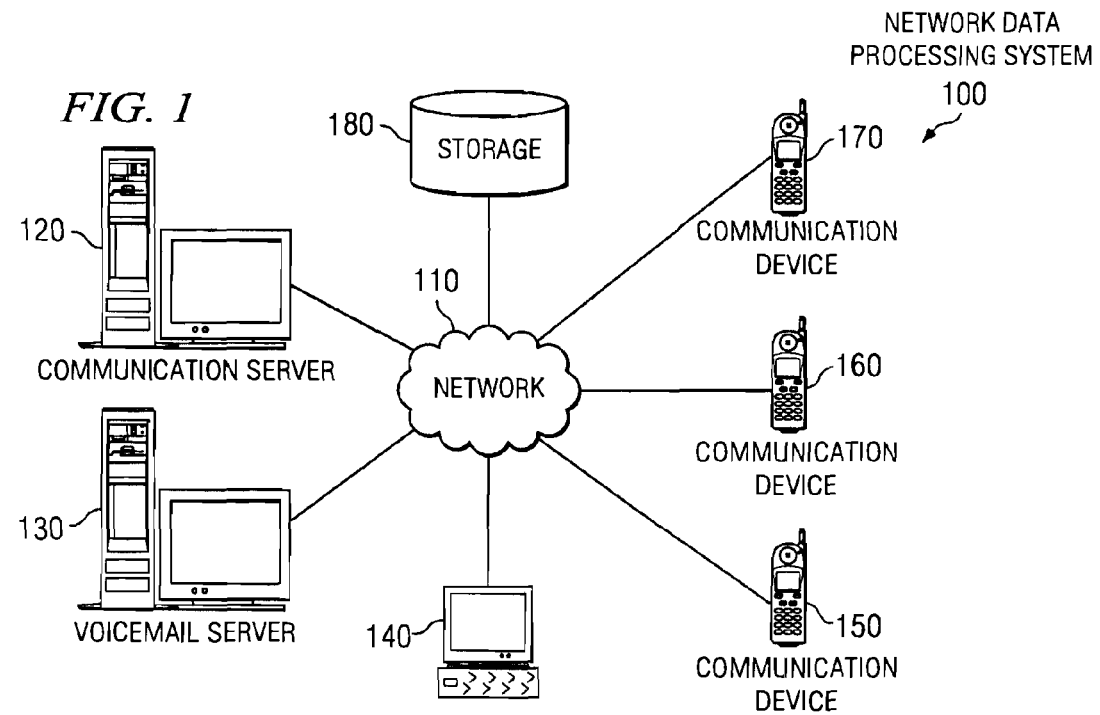
FIG. 1 is a pictorial representation of a network of data processing systems in which illustrative embodiments may be implemented.

With reference now to the figures, FIG. 1 depicts a pictorial representation of a network of data processing systems in which illustrative embodiments may be implemented. Network data processing system 100 is a network of computers in which illustrative embodiments may be implemented. Network data processing system 100 contains network 110, which is the medium used to provide communication links between various computers and other devices coupled together within network data processing system 100. Network 110 may include several types of connections, such as wire, wireless communication links, or fiber optic cables. However, for this illustrative embodiment depicted in FIG. 1, wireless communication links are emphasized.

In the depicted example of FIG. 1, servers 120 and 130 are coupled to network 110 by wire or wireless communication links. Server 120 may, for example, be a communication server and server 130 may, for example, be a voicemail server with high speed connections to network 110. However, it should be noted that in an alternative illustrative embodiment voicemail server 130 may reside within communication server 120.

Also, servers 120 and 130 may represent a plurality of communication and voicemail servers located within a local area network (LAN) or a wide area network (WAN). Further, communication server 120 and voicemail server 130 may, for example, reside within a cellular telephone service provider (SP) network. In another illustrative embodiment, communication server 120 and voicemail server 130 may, for example, independently provide communication services for a plurality of cellular telephone SP networks.

Communication devices 140, 150, 160, and 170, along with storage unit 180, also are coupled to network 110 via wire or wireless links. In addition, communication devices 140, 150, 160, and 170 are clients to communication server 120 and voicemail server 130. In this illustrative example, communication device 140 is a personal computer using a conventional land line communication link and communication devices 150, 160, and 170 are cellular telephones relying on wireless communication links.

However, it should be noted that besides being personal computers and cellular telephones, the communication devices shown in FIG. 1 may, for example, be personal digital assistants (PDAs), handheld computers, or laptop computers. Furthermore, illustrative embodiments are not restricted to the above-listed communication devices. Illustrative embodiments may utilize any communication device that is capable of accomplishing processes of illustrative embodiments.

Storage unit 180 represents any type of storage device that is capable of storing data in a structured and/or unstructured format. Also, storage unit 180 may represent a plurality of storage units coupled to network 110. Storage unit 180 may, for example, be a database for a communications network that contains customer information, such as customer names and telephone numbers.

Additionally, network data processing system 100 may, for example, include additional servers, clients, storage units, and other devices not shown. Moreover, network data processing system 100 may, for example, represent the Internet with network 110 representing a worldwide collection of networks and gateways that use the transmission control protocol/internet protocol (TCP/IP) suite of protocols to communicate with one another. Internet protocol (IP) telephony is the two-way transmission of voice over a packet-switched IP network, which is part of the TCP/IP suite of protocols. The terms "IP telephony" and "voice over IP" (VoIP) are synonymous. VoIP is a telephone service that uses the Internet as a global telephone network. At the heart of the Internet is a backbone of high-speed data communication lines between major nodes or host computers, consisting of thousands of commercial, government, educational and other computer systems that route data and messages.

Figure 2:
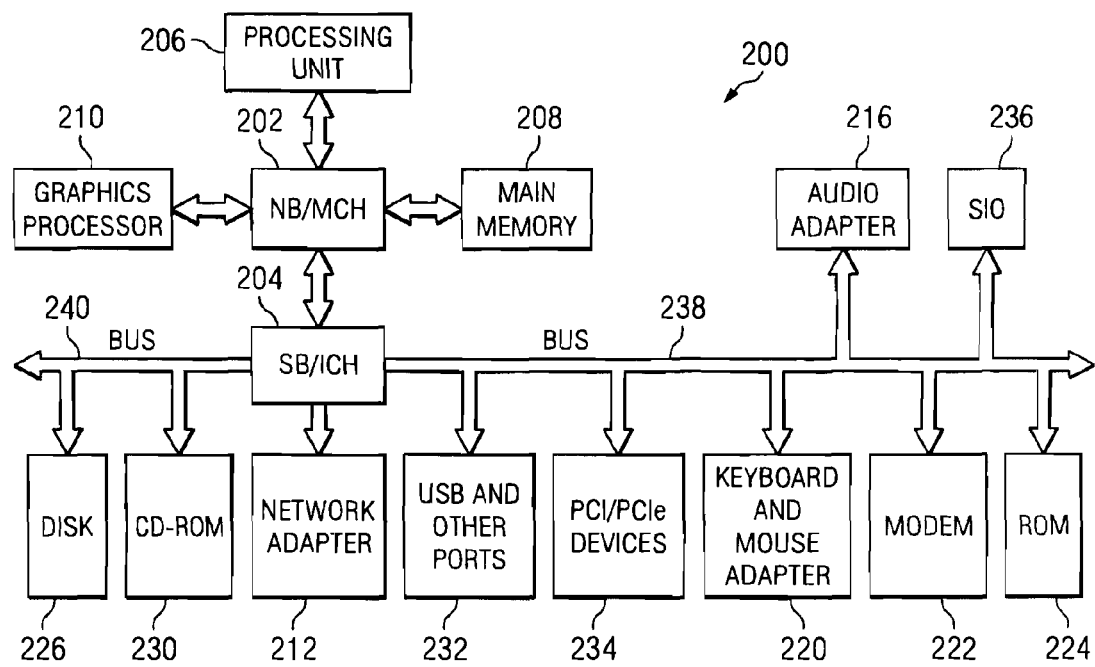
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as voicemail server 130 or communication device 140 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and MCH 202. Processing unit 206 may contain one or more processors and even may be implemented using one or more heterogeneous processor systems. Graphics processor 210 may be coupled to north bridge and MCH 202 through an accelerated graphics port (AGP), for example.

In the depicted example, local area network (LAN) adapter 212 is coupled to south bridge and ICH 204 and audio adapter 216, keyboard and mouse adapter 220, modem 222, read only memory (ROM) 224, universal serial bus (USB) ports and other communications ports 232, and PCI/PCIe devices 234 are coupled to south bridge and ICH 204 through bus 238, and hard disk drive (HDD) 226 and CD-ROM drive 230 are coupled to south bridge and ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM drive 230 may use, for example, an integrated drive electronics (IDE) or serial advanced technology attachment (SATA) interface. A super I/O (SIO) device 236 may be coupled to south bridge and ICH 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus, and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and MCH 202. A processing unit may include one or more processors or CPUs. The depicted examples in FIGS. 1 and 2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code in a voicemail system within a communication network for automatically selecting one of a plurality of outgoing messages to play for an incoming telephone call. In response to receiving an unanswered incoming call from the communication network, the voicemail system identifies the calling party by using, for example, caller ID. The voicemail system identifies the calling party by using the telephone number associated with the incoming call and/or the name associated with the incoming call, which is provided by the caller ID.

The voicemail system records the identified calling party's associated data, such as the telephone number and/or name, in a call log, which resides in a storage unit. However, it should be noted that illustrative embodiments may use a plurality of call logs. For example, illustrative embodiments may use a long outgoing message played call log, an abbreviated outgoing message played call log, a no outgoing message played call log, et cetera. The storage unit may, for example, be a remote storage unit, such as, for example, storage 180 in FIG. 1. Or, the storage unit may, for example, be a ROM, hard disk drive, or CD-ROM, such as ROM 224, HDD 226, or CD-ROM 230 in FIG. 2, residing in a voicemail server or a communication device, such as, for example, voicemail server 130 or communication device 140 in FIG. 1.

In addition, a user may generate and store data, such as contact names, telephone numbers, outgoing voicemail messages, and the like, in the storage unit. A contact is a person or entity that a user wishes to communicate with via a communication device. The user may manually, or the communication device may automatically, place these contact names and telephone numbers within, for example, a contact list. A contact list is a list of all contacts and the contact's associated data.

However, a contact list may only contain a subset of all the contacts stored within the storage unit. For example, one contact list may only contain data for family members, another for friends, yet another for co-workers, and so on. It should be noted that the storage unit may contain any data necessary for processes of illustrative embodiments to automatically select and play one of a plurality of outgoing messages for an incoming telephone call.

The voicemail system may remove telephone numbers and/or names associated with incoming calls from the one or more call logs based upon, for example, exceeding a predetermined time in the call log, exceeding a maximum storage space allocation for the call log, a user making a manual selection of a telephone number and/or name, or a global reset of the call log when a user creates a new outgoing message. The predetermined time in the call log may, for example, be 5 days, 2 weeks, or 1 month. The maximum storage space allocation for the call log may, for example, be 5 MB of data.

The voicemail system compares the identified calling party's associated telephone number and/or name against the data in the call log. Besides the telephone number and/or name associated with the calling party, the call log also may include information, such as date and time of the incoming call, number of times a calling party has called, which outgoing messages was played and the number of times the calling party has heard the played outgoing message, and whether the receiving party or user has listened to the calling party's incoming voicemail message(s).

After comparing the identified calling party's associated telephone number and/or name against the data in the call log, the voicemail system determines whether the identified calling party has previously heard the first outgoing message or not based on the call log data. If the identified calling party has not previously heard the first outgoing message, then the voicemail system plays the first outgoing message as a selected outgoing message for the incoming call. If the identified calling party has previously heard the first outgoing message, then the voicemail system plays a second outgoing message as the selected outgoing message for the incoming call.

The first outgoing message may, for example, be the original or a longer outgoing message. The second outgoing message may, for example, be an abbreviated or shortened version of the first outgoing message or the first outgoing message played at a higher speed, which reduces message play time, so that the caller may not be inconvenienced by hearing the same outgoing message over the same period of time on subsequent calls. Also, the second outgoing message may be one of a plurality of second outgoing messages. In other words, the voicemail system is capable of playing more than one second outgoing message. The voicemail system may, for example, utilize a set of rules or an algorithm to determine which of the plurality of outgoing messages to play.

The set of rules or algorithm may, for example, be as simple as playing the plurality of different outgoing messages on a rotating basis for subsequent incoming calls from a calling party. Alternatively, the set of rules or algorithm may compare the date and time of incoming calls with the date and time of the most recently created outgoing message and give the calling party the choice of repeating a previously heard outgoing message, playing the outgoing message at high speed, or skipping the message entirely. Or, the set of rules or algorithm may play a different outgoing message based upon which contact list the telephone number and/or name associated with the incoming call is located within in the storage unit. For example, the set or rules or algorithm may play one outgoing message for family members within the family contact list and another outgoing message for co-workers within the co-workers contact list.

It should be noted that the first and/or second outgoing message may, for example, be a voice message, an advertisement, a music segment, or any combination thereof. Also, it should be appreciated by those of ordinary skill in the art that a voicemail customer or user may change the outgoing message in the standard fashion by calling the voicemail system or by, for example, using a Web interface. Further, it should be noted that illustrative embodiments are not limited to use in voicemail systems only, but may be utilized by any communication system or service that uses any kind of pre-recorded messages for outgoing auto-responses, such as, for example, in electronic mail (e-mail) systems, instant messaging (IM) systems, short message services (SMS), and the like. In addition, businesses or other entities may utilize illustrative embodiments in, for example, hold queue systems.

Subsequent to playing either the first or second outgoing message, the voicemail system updates the call log data to indicate which selected message was played for the incoming call. Moreover, the voicemail system increments the call log to indicate the number of times the played message has been heard by the calling party. Furthermore, the voicemail system may, for example, optionally inform the calling party on a subsequent call back whether the receiving party or user listened to a previously recorded incoming voice message made by the calling party.

Thus, a customer or user utilizing a voicemail system that includes an illustrative embodiment may decrease a calling party's frustration and time spent listening to previously heard outgoing messages. In addition, illustrative embodiments may decrease a calling party's connection time costs by playing abbreviated outgoing messages or no outgoing message if the calling party has previously listened to the first or original outgoing message. Consequently, a user's satisfaction is increased by utilizing illustrative embodiments by knowing that calling parties may be happier and more satisfied with the improved voicemail system.

Figure 3:
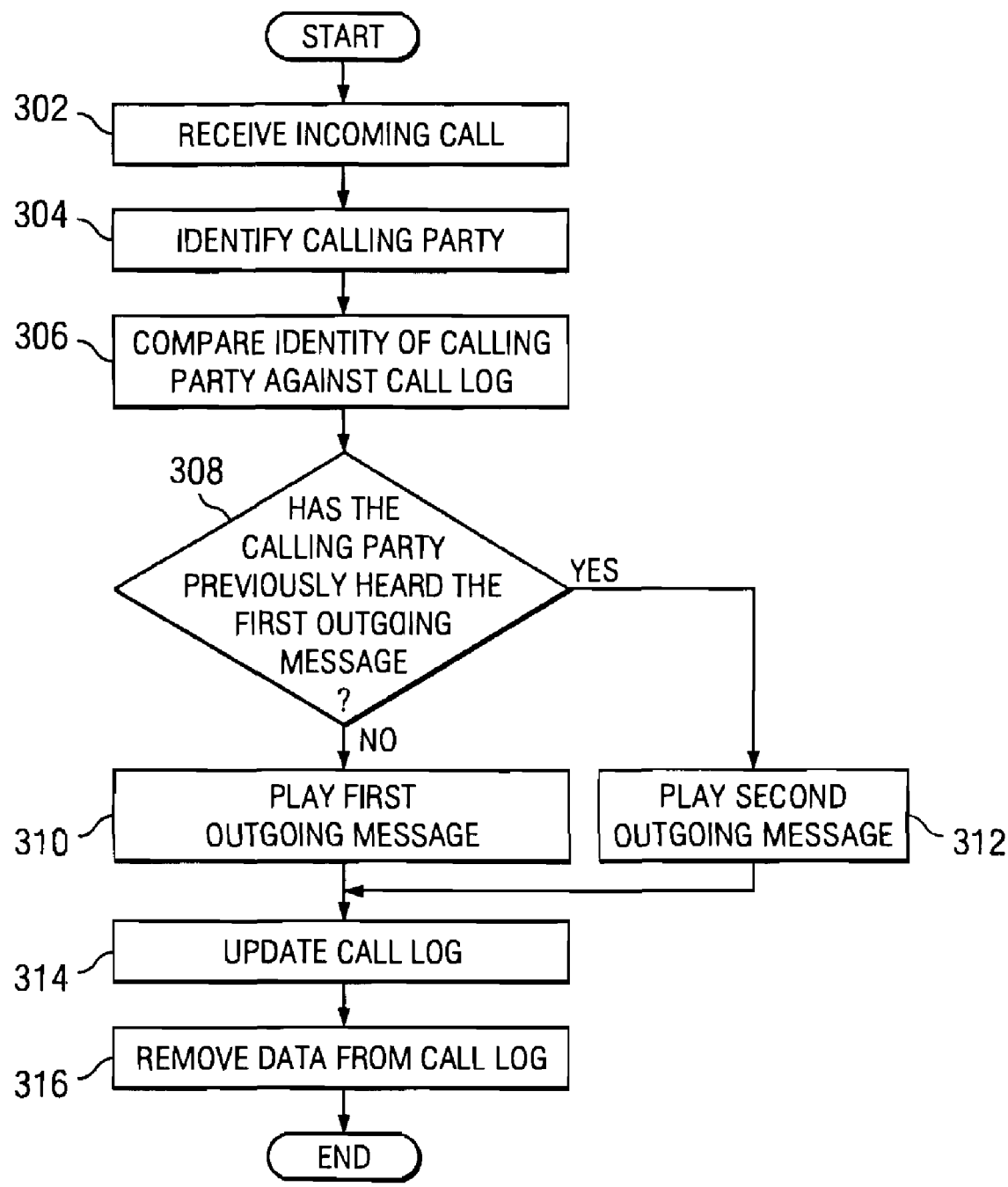
FIG. 3 is a flowchart illustrating an exemplary process for selecting an outgoing voice message for an incoming call in accordance with an illustrative embodiment.

With reference now to FIG. 3, a flowchart illustrating an exemplary process for selecting an outgoing voice message for an incoming call is shown in accordance with an illustrative embodiment. The process shown in FIG. 3 may be implemented in a voicemail server, such as, for example, voicemail server 130 in FIG. 1.

The process begins when the voicemail server receives an incoming call (step 302). Subsequent to receiving the incoming call in step 302, the voicemail server identifies the calling party using, for example, caller ID (step 304). After identifying the calling party in step 304, the voicemail server compares the identity of the calling party against a call log (step 306).

Subsequent to comparing the identity of the calling party against the call log in step 306, the voicemail server makes a determination as to whether the calling party previously heard the first outgoing message based on the call log data (step 308). The first outgoing message may, for example, be a long voice message. If the calling party has not previously heard the first outgoing message, no output of step 308, the voicemail server plays the first outgoing message for the calling party as a selected outgoing message (step 310). If the calling party has previously heard the first outgoing message, yes output of step 308, the voicemail server plays the second outgoing message for the calling party as the selected outgoing message (step 312). The second outgoing message may, for example, be an abbreviated voice message or the long voice message played at a higher speed.

After playing either the first outgoing message in step 310 or the second outgoing message in step 312, the voicemail server updates the call log to indicate which selected message was played and how many times the calling party has heard the selected message (step 314). Subsequent to, or concurrent with, updating the call log in step 314, the voicemail server may, for example, periodically remove data, such as telephone numbers and/or names associated with incoming calls, from the call log based upon a manual user selection or specified rules (step 316). The specified rules may, for example, be exceeding a predetermined time in the call log, exceeding a maximum storage space allocation for the call log, or a global reset of the call log when the user creates a new outgoing message(s). However, it should be noted that the voicemail server may remove data from the call log at any time and not necessarily just at step 316. The process terminates thereafter.

Thus, illustrative embodiments provide a computer implemented method, system, and computer usable program code for automatically selecting an outgoing voice message for an incoming call. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a ROM, a rigid magnetic disk, and an optical disk. Current examples of optical disks include compact disk—ROM (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O, devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically selecting an outgoing message for an incoming call, the method comprising:

responsive to receiving an incoming call, identifying, by a voicemail server device, a calling party to form an identified calling party;

comparing, by the voicemail server device, the identified calling party against call log data to determine that the identified calling party has previously heard an outgoing message;

responsive to determining that the identified calling party has not previously heard the outgoing message, playing, by the voicemail server device, the outgoing message as a selected outgoing message for the incoming call;

responsive to determining that the identified calling party has previously heard the outgoing message, playing, by the voicemail server device, the outgoing message at an increased speed as the selected outgoing message for the incoming call to reduce message play time;

recording, by the voicemail server device, an incoming voicemail message associated with the incoming call to form a recorded incoming voicemail message;

updating, by the voicemail server device, the call log data to identify the selected outgoing message played for the incoming call and to identify whether a receiving party listened to the recorded incoming voicemail message associated with the incoming call; and informing, by the voicemail server device, the identified calling party upon a subsequent incoming call whether the receiving party listened to the recorded incoming voicemail message.

2. The computer implemented method of claim 1, wherein the call log data resides in one or more call logs within a storage unit.

3. The computer implemented method of claim 1, wherein the call log data includes telephone numbers associated with incoming calls, and wherein the telephone numbers associated with the incoming calls are removed from the call log data based upon a global reset of the call log data when a new outgoing message is created.

4. The computer implemented method of claim 1, wherein the outgoing message is an advertisement.

5. The computer implemented method of claim 1, further comprising:

providing, by the voicemail server device, the identified calling party during a next incoming call after having the outgoing message played at the increased speed an option to select one of listening to the outgoing message, listening to the outgoing message at the increased speed, or skipping the outgoing message.

6. A computer program product stored in a computer readable storage medium have computer usable program code encoded therein that is executable by a computer for automatically selecting an outgoing message for an incoming call, the computer program product comprising:

computer usable program code for identifying a calling party to form an identified calling party in response to receiving an incoming call;

computer usable program code for comparing the identified calling party against call log data to determine that the identified calling party has previously heard an outgoing message;

computer usable program code for playing the outgoing message as a selected outgoing message for the incoming call in response to determining that the identified calling party has not previously heard the outgoing message;

computer usable program code for playing the outgoing message at an increased speed as the selected outgoing message for the incoming call to reduce message play time in response to determining that the identified calling party has previously heard the outgoing message;

computer usable program code for recording an incoming voicemail message associated with the incoming call to form a recorded incoming voicemail message;

computer usable program code for updating the call log data to identify the selected outgoing message played for the incoming call and to identify whether a receiving party listened to the recorded incoming voicemail message associated with the incoming call; and computer usable program code for informing the identified calling party upon a subsequent incoming call whether the receiving party listened to the recorded incoming voicemail message.

7. The computer program product of claim 6, wherein the call log data resides in one or more call logs within a storage unit.

8. The computer program product of claim 6, wherein the call log data includes telephone numbers associated with incoming calls, and wherein the telephone numbers associated with the incoming calls are removed from the call log data based upon a global reset of the call log data when a new outgoing message is created.

9. The computer program product of claim 6, wherein the outgoing message is an advertisement.

10. The computer program product of claim 6, further comprising:

computer usable program code for providing the identified calling party during a next incoming call after having the outgoing message played at the increased speed an option to select one of listening to the outgoing message, listening to the outgoing message at the increased speed, or skipping the outgoing message.

11. A data processing system for automatically selecting an outgoing message for an incoming call, the data processing system comprising:

a bus system;

a storage device connected to the bus system, wherein the storage device stores computer usable program code; and a processing unit connected to the bus system, wherein the processing unit executes the computer usable program code to identify a calling party to form an identified calling party in response to receiving an incoming call; compare the identified calling party against call log data to determine that the identified calling party has previously heard an outgoing message; play the outgoing message as a selected outgoing message for the incoming call in response to determining that the identified calling party has not previously heard the outgoing message; play the outgoing message at an increased speed as the selected outgoing message for the incoming call to reduce message play time in response to determining that the identified calling party has previously heard the outgoing message; record an incoming voicemail message associated with the incoming call to form a recorded incoming voicemail message; update the call log data to identify the selected outgoing message played for the incoming call and to identify whether a receiving party listened to the recorded incoming voicemail message associated with the incoming call; and inform the identified calling party upon a subsequent incoming call whether the receiving party listened to the recorded incoming voicemail message.

12. The data processing system of claim 11, wherein the call log data resides in one or more call logs within a storage unit.

13. The data processing system of claim 11, wherein the call log data includes telephone numbers associated with incoming calls, and wherein the telephone numbers associated with the incoming calls are removed from the call log data based upon a global reset of the call log data when a new outgoing message is created.

14. The data processing system of claim 11, wherein the outgoing message is an advertisement.

15. The data processing system of claim 11, wherein the processing unit further executes the computer usable program code to provide the identified calling party during a next incoming call after having the outgoing message played at the increased speed an option to select one of listening to the outgoing message, listening to the outgoing message at the increased speed, or skipping the outgoing message.

* * * * *